United States Patent
Cebula et al.

[11] 3,866,126
[45] Feb. 11, 1975

[54] SIGNAL MEASURING AND COUNTING APPARATUS AND METHODS

[75] Inventors: Leonard A. Cebula, Philadelphia; Joseph F. Fitzpatrick, Jr., Warminster; Justin A. Kershaw, Jr., Churchville, all of Pa.

[73] Assignee: Technitrol, Inc., Philadelphia, Pa.

[22] Filed: Feb. 20, 1973

[21] Appl. No.: 334,054

[52] U.S. Cl.................... 328/15, 321/60, 324/99 R, 324/181, 328/56
[51] Int. Cl. .......................................... H03k 5/159
[58] Field of Search ............ 328/15, 56, 13; 332/16, 332/27; 321/60; 324/186, 99 R, 188, 181

[56] References Cited
UNITED STATES PATENTS
3,325,721  6/1967  Clark ............................... 328/15 X Primary Examiner—Stanley T. Krawczewicz
Attorney, Agent, or Firm—Yuter & Rosen

[57] ABSTRACT

Signal measuring apparatus and methods for measuring time intervals and voltage levels of signals wherein the time intervals involved may be in the nanosecond region. The invention contemplates the use of an incremental time counter in which the frequency of a clock base oscillator is multiplied so that a relatively low frequency oscillator of high accuracy may be used to measure short term signals. The oscillator is connected to a counting device by delay lines so that the oscillator signal is sequentially presented to the counting device. Each time a signal is received a count is recorded so that, for example, five signals may be presented to the counting device for each period of the oscillator signal thereby effectively multiplying the oscillator frequency by a factor of five.

The signal measuring apparatus comprises time interval apparatus for measuring the time of occurence of events in a waveform in the nanosecond region and may include an incremental time counter of the type described and a test signal generator which is triggered by the time counter at zero time so that they are in synchronism. The time interval apparatus is programmed to stop counting when the desired event occurs thereby measuring the elapsed time of occurrence of the event.

The signal measuring apparatus further comprises voltage measuring apparatus for measuring the voltage at a specific point in a voltage waveform and may include an incremental time counter of the type described. The apparatus further includes a strobe device operable at the desired instant to cause the voltage of the waveform to be recorded. Additionally, circuits are disclosed for converting the measured value of the waveform into a digital number.

The disclosure also specifies novel methods for measuring time intervals of waveforms and for measuring the amplitude of a signal in digital notation.

11 Claims, 4 Drawing Figures

INTERVAL MEASURING APPARATUS 140

FIG. 4

SIGNAL MEASURING AND COUNTING APPARATUS AND METHODS

This invention relates generally to apparatus for measuring the characteristics of a signal and novel methods of accomplishing the same and, more particularly, pertains to apparatus and methods for measuring the amplitude or time of occurance of an event in a signal and to a unique counting arrangement for counting increments of time in a time interval.

Many devices and methods have been utilized in the past to measure the time interval of a waveform such as a pulse or the time of occurrence of an event in a waveform such as the time interval for a waveform to reach a desired percentage of its peak value. For the most part, where the time intervals to be measured are relatively long, no problems are usually encountered. However, in those situations wherein the time intervals are relatively short, such as in the nanosecond or subnanosecond region, major difficulties are encountered in obtaining accurate and reliable measurements.

For example, one apparatus and method presently in widespread use for measuring time intervals of the magnitude under consideration makes use of an oscilloscope which displays the waveform via sampling techniques. To be more specific, a sampling circuit detects the value of the signal at different times measured from the leading edge of each signal in the signal train. The total sampling is then applied to the oscilloscope which displays a —reconstructed" signal on its screen. The interval may then be determined from the time base of the oscilloscope and the graduations on its face. However, since each sampling is performed on a different signal in the signal train, it is obvious that this technique is quite useless for measuring intervals of a non-repetitive signal. Additional disadvantages of this type of system reside in the fact that the reconstructed waveform is not a real time measurement and it may take as long as a millisecond to obtain a measurement. Another major disadvantage of the above-described system resides in the fact that its accuracy decreases as the measured time interval increases above 100 nanoseconds. Thus, this type of time measuring system is severely limited in its versatility.

Another type of apparatus and method used to obtain time interval measurements in the nanosecond region makes use of a time averaging interval counter. Although the accuracy of such counters may be made to approximate that of the oscilloscope method noted above (when used below the 100 nanosecond value) the time interval required for such measurements is inordinately large (about 100 milliseconds) and it therefor places a severe limitation on the use of such device. To be more specific, the interval counter operates by averaging the time interval of a number of signals in a signal train. In order to obtain a resolution of 10 picoseconds, the device must sample 100 signals. Conceivably, this operation, in addition to requiring a repetitive waveform, may take as long as 0.1 seconds.

Accordingly, an object of this aspect of the invention is to provide an improved time interval counter for measuring intervals of time in the nonosecond region.

A more specific object of the invention is to provide a time interval counter which has a resolution at least as great as devices used heretofore but which require only the reception of a single waveform to measure the time inverval. That is, the time interval counter of the present invention is adapted to perform real time measurements with high resolution.

A further object of the invention resides in the novel details of construction which provide a time interval counter of the type described which has a relatively small recovery time thereby permitting the same instrument to measure time intervals of a number of different signals in a minimum amount of time by multiplexing techniques.

Another object of the invention is the provision of a time interval counter which maintains the same high resolution over a relatively long measurement period which, in one embodiment, may extend from one to 1,000 nanoseconds. Hence, the counter may be utilized to measure time delay between waves passing through a semiconductor chip thereby to classify the chips.

Accordingly, a time interval counter constructed according to the present invention comprises timing means for counting increments of time in a time interval and is responsive to a stop signal for terminating the counting operation. A test signal generator is provided and synchronizing means synchronizes the operation of the test signal generator with the timing means. Output terminals are connected to the test signal generator and are adapted to be connected to a load under test to apply the test signal to the load to stimulate the load to generate the voltage waveform to be measured. Input terminals are adapted to receive the waveform to be measured and comparing means is connected to the input terminals for applying a stop signal to the timing means in response to the detection of a desired event such as termination of the waveform. Hence, the timing means will indicate the elapsed interval of time.

The propagation delay inherent in a time measuring system of the type described is significant because the delay may be comparable to or greater than the particular time interval to be measured. Accordingly, a feature of the present invention is a provision of a time interval counter in which propagation delay is automatically compensated for so that only the time interval measured is indicated by the system or apparatus.

A problem heretofore encountered is providing measuring apparatus of the type under consideration resided in the lack of an accurate time base clock or oscillator which could operate at the required frequency. Thus, for a device to perform time measurements in the nanosecond region, for example, an oscillator of 1GHz is required. However, presently available commercial devices cannot operate at the frequency under consideration and still provide the required accuracy and resolution.

Accordingly, an object of this aspect of this invention is to provide an improved counting apparatus for counting increments of time.

A more specific object of the invention is to provide a counting apparatus which has a high resolution.

Another object of this aspect of the invention is to provide a counting apparatus which is highly accurate and reliable.

Accordingly, a counting apparatus constructed according to the invention comprises oscillator means for producing a periodic signal. Counting means is provided which has a plurality of input terminals for counting an increment of time in response to a signal appearing at an input terminal. Connecting means is between each one of the plurality of input terminals and the oscillator means and it is operable to apply the oscillator signal to the plurality of input terminals in a predetermined sequence.

Thus, a feature of this aspect of the invention is the use of a reliable oscillator means at a relatively low frequency which is multiplied to a higher frequency by the sequential presentation of the oscillator signal at the input of a counter to provide a desired time base signal.

At present, when it is desired to measure the value or amplitude of a voltage waveform at a specific time during the occurrence of the waveform many different pieces of equipment must be utilized thereby needlessly tying up instruments which could otherwise be utilized elsewhere and also increasing the overall cost of making the measurement. To be more specific, utilizing present day techniques a voltage measurement of the type under consideration is made by a strobing voltmeter which, in effect, produces a strobe signal at the desired instant. The strobe signal controls an associated device which produces the voltage measurement of the waveform at the instant the strobe signal is received. However, a strobing voltmeter is an inherently slow device and, additionally, produces an analog output signal. If a digital output signal is required, a digital voltmeter must be used in conjunction with the strobing voltmeter. Moreover, these voltage measurement devices are limited in their use as they cannot determine the point in time that a specific voltage occurs.

Accordingly, an object of this aspect of the present invention is to provide an improved voltage measuring apparatus.

A more specfic object is to provide voltage measuring apparatus in which a minimum number of instruments are utilized to perform a measurement.

Another object of this invention is to provide a voltage measuring apparatus which is reliable in operation and which may be accurately programmed to determine the voltage of a signal at a specific desired or predetermined time.

Accordingly, a signal measuring apparatus constructed in accordance with the present invention comprises input terminals adapted to receive a voltage waveform from a load stimulated by a test signal and sampling means is connected to the input terminals and is operable in response to a strobe signal for producing a sampling signal representative of the value of the voltage waveform applied to the sampling means at the time the strobe signal is received. Indicating means is connected to the sampling means and indicates the value of the voltage waveform. Output terminals are adapted to be connected to the load and timing means is provided for applying a test signal to the output terminals and a strobe signal to the sampling means a preselected interval of time after the application of the test signal to the output terminals.

A feature of this aspect of this invention resides in the novel details of construction which provide a voltage measuring apparatus of the type described in which the measuring voltage is presented in binary coded decimal form for immediate presentation to a computer or the like.

The invention further contemplates novel methods for measuring time intervals and for determining the amplitude of a voltage waveform.

Other objects and features will become more apparent from a consideration of the following detailed description when taken in conjunction with the accompanying drawings, in which:

As noted hereinabove, the apparatus of the present invention is ideally suited for measuring signals which have a period in the nanosecond region. Although the apparatus and techniques disclosed hereinbelow may be utilized in conjunction with measurements of signals having greater periods by changing the time constants involved in the circuit. For the purposes of the present application, the various apparatus and techniques referred to hereinbelow will be discussed in conjunction with measuring time increments of 1 nanosecond and ranges of from 1 to 1,000 nanoseconds. It is noted, however, that this is for illustrative purposes only and is not to be interepreted as being a limitation of the present invention.

Figure 1:
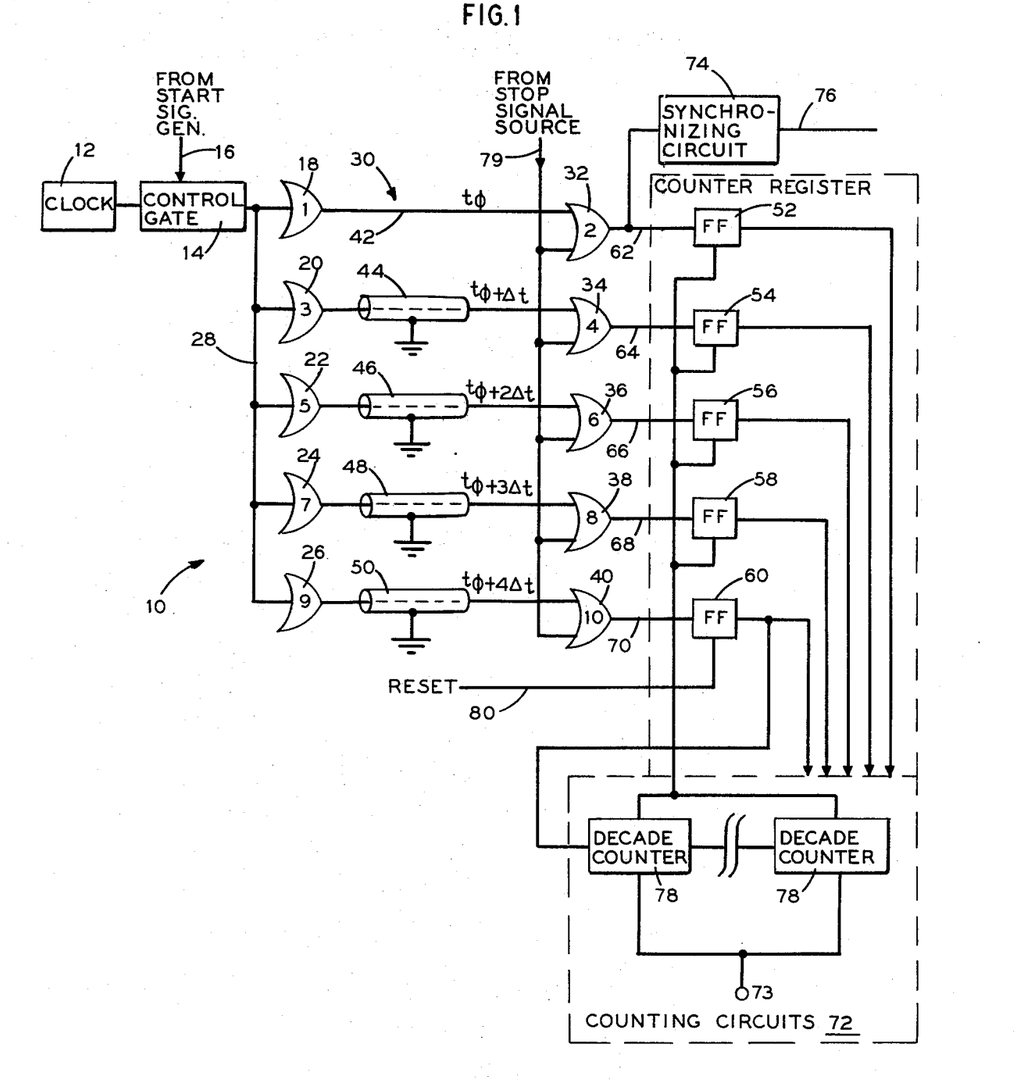
FIG. 1 is a schematic circuit wiring diagram, partially in block and logic form, of a time increment counting circuit constructed according to the present invention.

The apparatus of the present invention utilizes a unique time increment counter designated generally by the reference numeral 10 in FIG. 1. The increment counter 10 utilizes a base oscillator and is operable to multiply the frequency of the oscillator by a factor of five thereby retaining the accuracy and reliability of a low frequency oscillator while producing essentially a high frequency signal. The effective high frequency signal is applied to conventional counting circuits which may encode the signal as binary coded decimal numbers. The signals thus encoded may be applied to a decoder which causes a decimal number to be displayed in a conventional manner.

More specifically, the time increment counter 10 comprises a clock 12 which may be a highly reliable oscillator that produces a periodic signal such as a sinusoid. The clock 12 is connected to a control gate 14 which insures that the circuitry following the gate 14 will begin operation at a preselected point on a signal generated by the clock 12 (i.e., it synchronizes the succeeding circuitry to the oscillator signal). Thus, the control gate 14 may comprise an AND gate having one terminal connected to the clock 12 and another terminal connected to a lead 16 which is adapted to receive a start signal. If a start signal is present on lead 16, a signal will be produced at the output of the control gate 14 when the clock signal 12 goes low.

On the other hand if no start signal is present, the signal from the clock 12 will be inhibited by the gate 14. The output terminals of the control gate 14 are connected by a lead 28 to the input terminals of respective buffer circuits 18–26. The buffer circuits 18–26 are connected by connecting means designated generally by reference numeral 30 to one input terminal of respective AND gates 32–40. The connecting means 30 comprises a lead 42 which connects the output terminals of the buffer circuit 18 to the input terminals of the AND gate 32. A delay line 44 connects the output terminals of the buffer circuit 20 to the input terminals of the AND gate 34. A delay line 46, which produces twice as much delay as the delay line 44, connects the output terminals of the buffer circuit 22 to the input terminals of the AND gate 36. A delay line 48, which introduces three times as much delay as the delay line 44, connects the output terminals of the buffer circuit 24 to the input terminals of the AND gate 38. In a similar manner, the delay line 50, which introduces four times as much delay as the delay line 44, connnects the output terminals of the buffer circuit 26 to the input terminals of the AND gate 40.

The following example will illustrate that the elements thus far described in the time increment counter 10 effectively multiply the frequency of the clock 12 by a factor of five. Thus, if it is assumed that the clock 12 produces a 200 MHz signal, the period of the signal will be 5 nanoseconds. The delay line 44 is designed to produce a 1 nanosecond delay. Accordingly, the delay line 46 will therefore produce a 2 nanosecond delay; the delay line 48 will produce a 3 nanosecond delay and the delay line 50 will produce a 4 nanosecond delay. Therefore the signals appearing at the input terminals to the AND gate 32-40 will be sequentially presented thereto over an interval of 5 nano seconds. That is, each signal appearing at one of the AND gates 32-40 will appear 1 nanosecond later than the signal appearing at the preceeding AND gate. 5 nanoseconds later the signal from the clock 12 will initiate a new cycle so that effectively the elements thus far described may be thought of as producing a 1,000 MHz or 1 GHz signal. Since it is easier to obtain a more accurate clock or oscillator at the 200 MHz frequency, it is obvious that the time increment counter 10 will be a very highly accurate counter with a high resolution, as noted in greater detail below.

The output terminals of the AND gates 32-40 are connected to the respective input terminals of bistable devices or flip-flops 52-60 by respective 62-70. The flip-flops 52-60 are conventional in construction and are adapted to change their states whenever a signal appears at the input terminals. The output terminals of the flip-flops or bistable devices 52-60 are connected to a conventional counting circuit 72 which encodes the state of the flip-flops or bistable devices as binary coded decimal members in decade counters 78, two of which are shown in FIG. 1. These binary encoded numbers may then be applied to a decoder which, in turn, decodes and displays the increments counted as a decimal number (as described in greater detail with respect to the apparatus shown in FIG. 3) or may present the binary coded decimal number at a desired output terminal 73.

A synchronizing circuit 74 is connected to the lead 62 and is adapted to produce a synchronizing signal on a lead 76 to synchronize or initiate the operation of an external device with the time increment counter 10. That is, the signal appearing on the lead 62 (which initiates the counting operation in the counting circuit 72) also triggers a desired event by the signal appearing on the lead 76.

A lead 79 is connected to the other input terminal of the AND gates 32-40 and is adapted to disable or inhibit the AND gates when a stop signal is applied to the lead 79 thereby to terminate the counting operation. That is, the external device may be programmed so that upon the detection of a desired event, the stop signal will be generated and applied to the lead 79.

In operation, the oscillator or the clock 12 will continuously generate signals. However, the disabled control gate 14 will prevent these signals from reaching the lead 28 and the buffer circuits 18-26. When it is desired to count time increments, a start signal is applied to the lead 16 thereby enabling the control gate 14 to permit the clock signal to reach the buffer circuits 18-26. Assuming that no stop signal is present on lead 79, the AND gates 32-40 will be enabled. Accordingly, the clock signal passing through the circuit 18 will immediately be applied to the input terminals of the AND gate 32 via the lead 42 thereby to cause the flip-flop or bistable device 52 to change states. The change in state of the bistable device 52 will be decoded as a zero count in the counting circuit 72. Simultaneously therewith, the signal applied to the lead 62 will also cause a synchronizing signal to be produced on the lead 76 by the synchronizing circuits 74 whereby to stimulate an external load to produce the event that is to be measured.

One nanosecond thereafter (using the parameters of the above example) a signal will be applied to the input terminals of the AND gate 34 via the buffer circuit 20 and the delay line 44. Thus, the bistable device 54 will change states thereby to record a count of 1 nanosecond in the counting circuit 72. 2 nanoseconds after the bistable device 52 has changed states, a signal will be applied to the input terminals of the AND gate 36 via the buffer circuit 22 and the delay line 46. Hence, the bistable device 56 will change states. The change of states of the bistable devices 52, 54 and 56 will thereby be decoded as a count of two nanoseconds in the counting circuits 72. That is, two nanoseconds will have elapsed since the generation of the synchronizing signal on the lead 76. Similar comments apply to the remaining bistable devices 58 and 60 and their connecting circuitry so that upon the change of state of the bistable device 60, a count of 4 nanoseconds will be registered in the counting circuits 72.

At this point, the signal produced by the clock 12 will have completed its cycle (i.e., 5 nanoseconds will have elapsed) and a new signal will appear at the input terminals to the buffer circuit 18. This signal will again be sequentially presented to the input terminals of the AND gates 32-40 to again cause the bistable devices to sequentially change back to their original states. As each bistable device changes back, the change in state will be recorded as another count in the counting circuit 72 so that the time increment counter 10 counts the interval of elapsed time in 1 nanosecond increments. In the preferred embodiment, three decade counters 78 are provided in the counting circuits 72 so that a count of 999 may be registered.

Upon the occurrence of the desired event (i.e., upon termination of the counting interval), a stop signal is applied to the lead 76 thereby disabling the AND gates 32-40 to prevent further toggling of the bistable devices 52-60. Accordingly, the counting circuits 72 will now indicate the interval of time that has elapsed since the generation of the signal on the lead 76 which stimulated the external load device.

A lead 80 is connected to the reset terminals of the flip-flops 52-60 and the decade counters 78 in the counting circuits 72. A pulse applied to the lead 80 from any suitable source will reset the bistable devices so a new counting cycle can be initiated.

In an actual embodiment of a time increment counter of the type described, the parameters noted above with respect to the frequency of the oscillator in the clock 12 and the delay of the delay lines was utilized. The gate circuits selected were capable of sub-nanosecond speeds of operation and bistable devices were selected which could change states at the rate of 300 MHz. The propagation delay through the circuits was between 0.9 and 1.1 nanoseconds. To reduce propagation time and transient response to a minimum, microstrip techniques were utilized to maintain constant impedance transmission lines.

In particular, the clock signal was distributed to the buffer circuits 18–26 using a series termination technique; however, no series resistor was used. The distance between the output terminal on the clock and the input terminals to each of the buffer circuits 18–26 was made equal. The result provided a time interval counter with an accuracy of ± 1 nanosecond plus the accuracy of the time base clock frequecy which was 5 parts in 1,000,000. Additionally, a 100 nanosecond recycling time was obtained (as compared with 0.1 seconds for the time accumulation counter and 1 millisecond for the oscilloscope method of the prior art).

While the time interval counter described above is suitable for the specific parameters of the example, it is to be noted that other parameters may be utilized equally as well in which case the number of signal paths and the various delays may also be varied to accommodate the specific increments which are to be counted.

Figure 4:
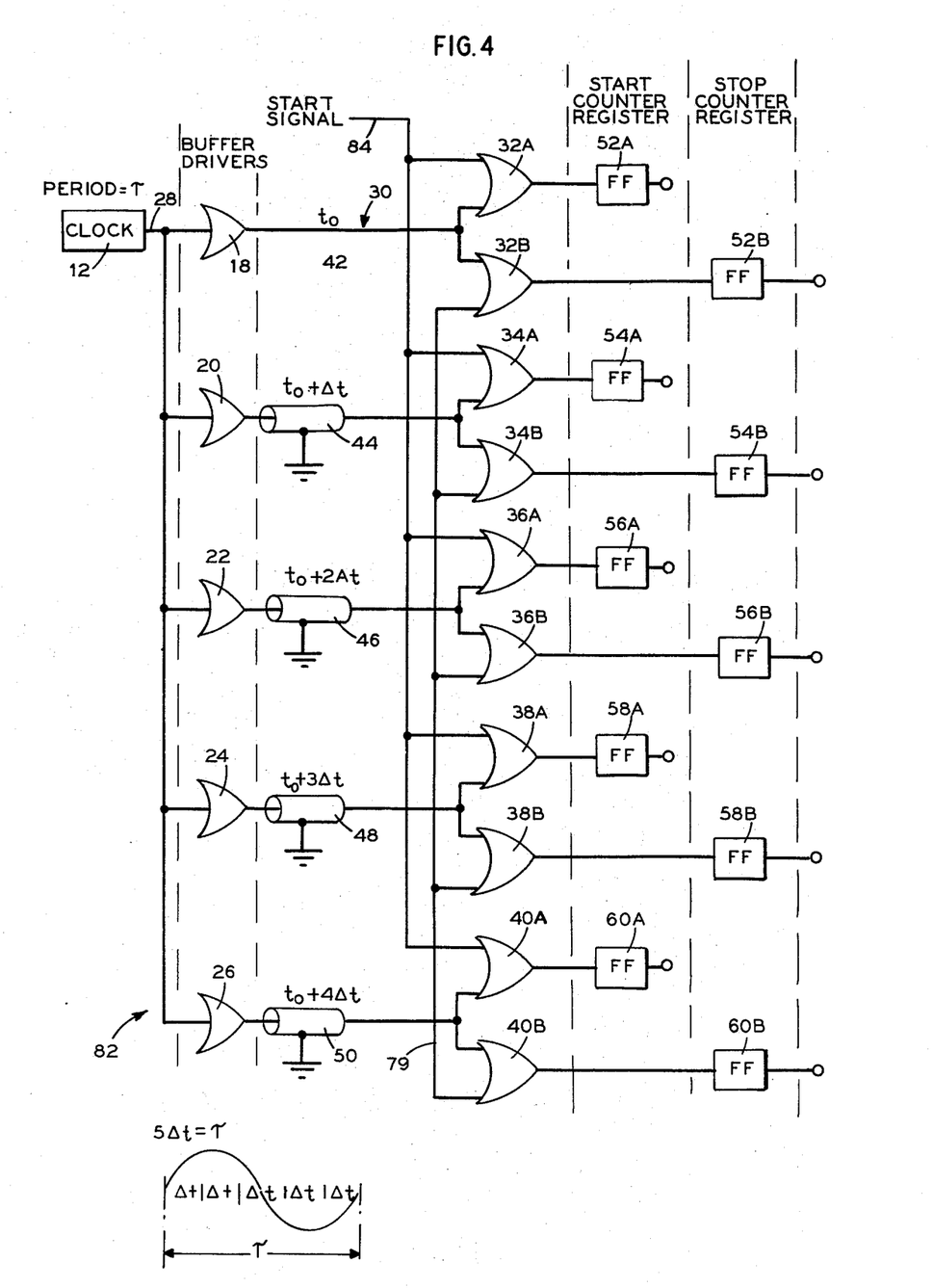
FIG. 4 is a schematic circuit wiring diagram partially in block and logic form of a modified embodiment of a time increment counting circuit.

A modified embodiment of a time interval counter designated generally by reference numeral 82 is shown in FIG. 4. The time interval counter 82 is similar to the time interval counter 10 and similar reference numerals indicate identical elements. Accordingly, only the differences between the counter 82 and the counter 10 will be described.

It is to be noted that the control gate 14 is eliminated in the counter 82. Additionally, a pair of AND gates is connected to each one of the connecting means 42–50. Each pair of gates in FIG. 4 is identified by the same numeral as the corresponding gate in FIG. 1 but with a letter suffix to distinguish between the two gates. For example, the lead 42 is connected to one input terminal of each of the gates 32A and 32B. Similar comments apply to the connections of each one of the delay lines 44–50. The other terminal of each one of the gates ending with the suffix letter "A" is connected to a start lead 84. When a start signal is applied to the lead 84, the gates connected thereto are disabled. The other terminal of the AND gates bearing the letter "B" designation are connected to the stop lead 79. These gates are disabled when a signal appears on the lead 79.

In a similar manner, a pair of bistable devices are provided for each one of the connecting means 42–50. Each pair of bistable devices is identified by the same numeral as the corresponding bistable device in the embodiment of FIG. 1 but with a suffix letter designation (either A or B) to distinguish between bistable devices of a particular pair. For example, delay line 44 is associated with bistable devices or flip-flops 54A and 54B. Each one of the bistable devices bearing the letter A suffix is connected to the output terminals of the AND gate bearing the same letter suffix A. Likewise, each one of the bistable devices bearing the letter B suffix is connected to the output terminals of the AND gates bearing the letter B suffix.

The output terminals of the A bistable devices 52A–60A are connected to a start counting circuit or register (not shown) and the output terminals of the B bistable devices are connected to a stop counting circuit or register (not shown).

In operation, under normal circumstances, no signal will appear on the lead 84 or the lead 78. Accordingly, all of the AND gates 32A–40A and 32B–40B will be enabled. Thus, the signals from the clock 12 will be sequentially applied to each pair of bistable devices thereby to cause the pair of bistable devices to sequentially change states. That is, initially bistable devices 52A and 52B will change states. 1 nanosecond thereafter bistable devices 54A and 54B will change states. It is obvious, therefore, that the counting circuits or registers connected to each set of bistable devices will be in synchronism with each other and will register the same counts. When it is desired to initiate a counting interval to count increments of time, a start signal is applied to the lead 84 simultaneously with the simulation of the load device which is to produce the event to be measured. All of the A AND gates will therefore be disabled thereby preventing the A bistable devices from again changing states. Thus, the count in the start counting register will remain at a fixed number corresponding to the number in the register at the time the interval began. On the other hand, the B flip-flops or bistable devices 52B–60B will continue to change state thereby increasing the count in the stop counting register or circuits.

When the desired event occurs, a stop signal will be applied to the lead 79 thereby disabling the B AND gates 32B–40B. Accordingly, the bistable devices 52B–60B will cease changing states so that the count in the stop counting register will remain fixed. The elapsed time interval may then be determined by subtracting the count in the stop counting register from the count in the start counting register. Prior to initiating a new counting cycle, the registers and bistable devices may be reset by applying a proper reset signal to the reset terminals (not shown in FIG. 4) of bistable devices and the registers.

Figure 2:
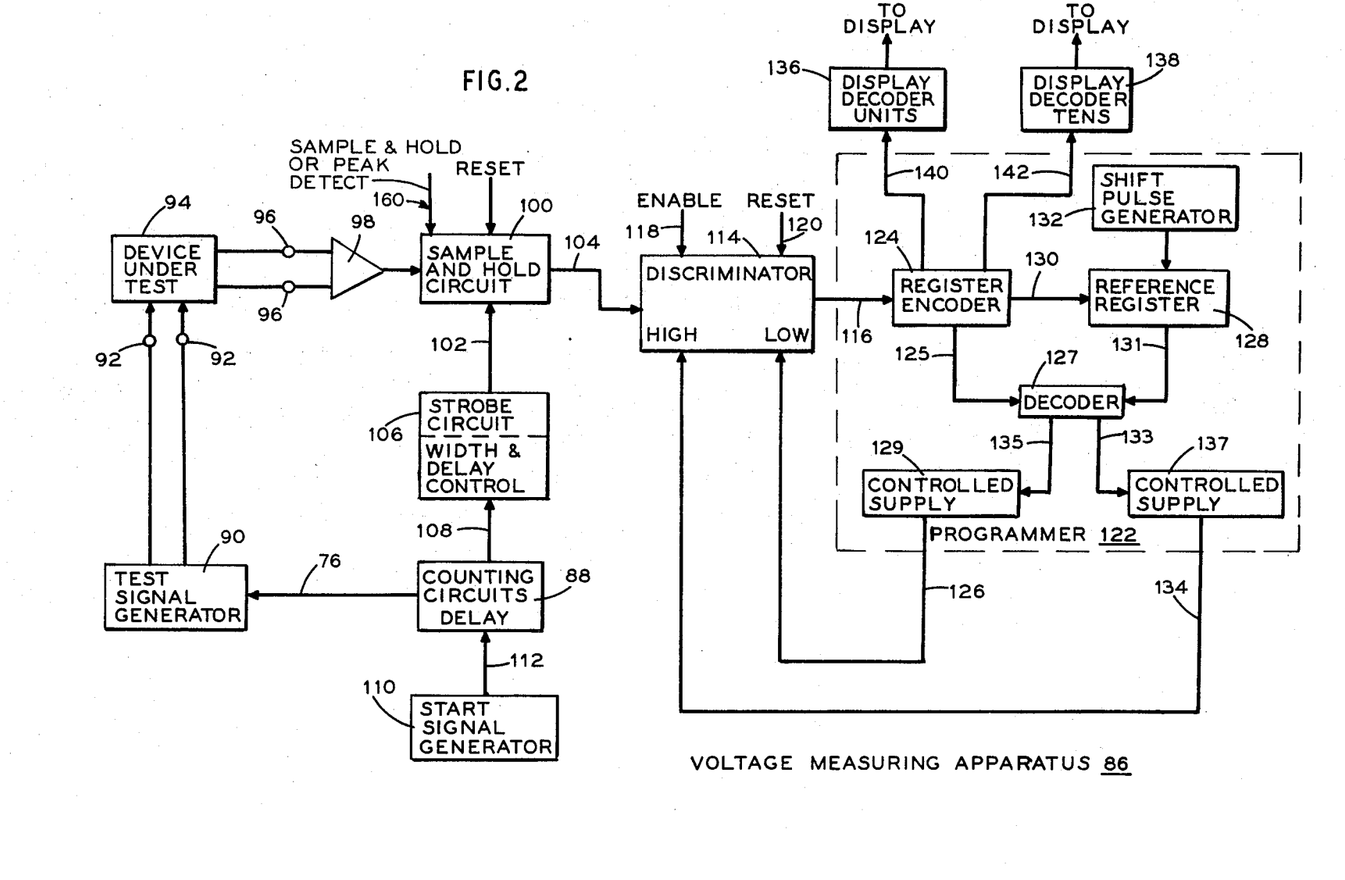
FIG. 2 is a schematic system diagram, in block form, of a signal measuring apparatus constructed according to the present invention and incorporating the time increment circuit of FIG. 1.

Voltage measuring apparatus constructed in accordance with the present invention is designated generally by the reference numeral 86 in FIG. 2 and may include time increment counting circuits of the type shown in FIGS. 1 or 4. Thus, the apparatus 86 comprises counting circuits 88 which are connected to a test signal generator 90. The test signal generator 90 is adapted to produce a test signal in response to the synchronizing signal appearing on the lead 76 at the initiation of a counting interval and to apply the test signal to output terminals 92. Connected to the output terminals is a load device 94 which is to be tested. Thus, the test signal may cause the device 94 to generate a voltage waveform which is to be measured. The output terminals of the device 94 are connected to input terminals 96 of the apparatus and receives the voltage waveform to be measured. The input terminals 96 are connected to a difference amplifier 98 which preferably is a DC restored and DC coupled amplifier. The DC restored feature enables the amplifier to recover from line transient overloads caused by common mode disturbances occuring prior to the reception of the voltage waveform to be measured and the amplifier further enables the apparatus 86 to measure voltage waveforms that are removed from ground.

The output terminals of the amplifier 98 are connected to a sample and hold circuit 100. The circuit 100 is conventional in nature and operates to sample the signal applied thereto by the amplifier 98. When a strobe signal is applied to the sample and hold circuit 100 via a lead 102 (which is connected to a strobe input terminal) the circuit produces a DC level which is proportional to the amplitude of the voltage waveform applied thereto at the instant the strobe signal is received. This "sampling" signal is then applied to a lead 104 connected to the output terminals of the circuit 100. The lead 104 is connected to an arrangement for displaying the amplitude of the voltage waveform at the desired point in time in decimal numbers, as noted in greater detail below.

The strobe signal applied to the lead 102 originates from a strobe circuit 106 which, in turn, is stimulated by a signal from the counting circuits 88 via a lead 108.

In order to produce the strobe signal a preselected interval of time after the load device has been stimulated (i.e., after the generation of the signal on lead 76), presettable delay means may be provided in the counting circuits 88. For example, the presettable delay means may take the form of an encoder which encodes decimal numbers in binary coded decimal form (i.e., as various voltage patterns produced by bistable devices). The encoder is connected to a comparator circuit which is also connected to the binary coded decimal counting circuits of the type shown in FIG. 1. When the count in the counting circuits (represented by the same pattern of voltages), reaches the preset count, the comparator will produce an output pulse in the conventional manner on the lead 108 thereby stimulating the strobe circuit 106 to produce the strobe pulse on the lead 102. Since the counting circuits 88 also generate the pulse which stimulates the test signal generator 90, it is obvious that the strobe signal will be in synchronism with the voltage waveform from the device 94 so that the strobe signal is produced at the desired point in time.

Alternatively, the delay means in the counting circuits 88 may take the form of a conventional variable delay line which may be preset manually to introduce a desired delay. Again, since the test signal generator 90 is enabled or stimulated by the counting circuit 88 which simultaneously apply a signal to the delay means at the time the signal which stimulates the test signal generator 90 is produced, the strobe signal applied to the lead 102 will be in synchronism with the voltage waveform produced by the device 94.

Thus, the counting circuits, the test signal generator and the strobe circuit may be considered to be timing means which applies a test signal to the output terminals and a strobe signal to the circuit 100 a preselected interval of time thereafter. Also the counting circuits and delay device may be considered to be a control signal generator and associated delay arrangement.

The particular delay may also be produced externally of the counting circuits 88. For example, conventional strobe circuits normally include both width and delay controls so that the strobe pulse can be controlled in both time of occurrence and length of occurrence.

A voltage measuring cycle is initiated by a start signal generator 110 which applies a start signal to the counting circuits 88 via a lead 112. In operating the elements of the apparatus 86 thus far described above, the desired delay of the strobe signal is introduced into the counting circuits (or alternatively in the strobe circuit 106). Thereafter the start signal generator 110 is energized to cause the counting circuits 88 to begin counting time increments. Simultaneously with the operation of the counting circuits, the synchronizing signal is produced which causes the test signal generator 90 to apply the test signal to the device 94 thereby to stimulate the device 94 to produce the voltage waveform. The voltage waveform is applied to the sample and hold circuit 100 through the amplifier 98. A preselected interval of time thereafter, the strobe circuit 106 will be enabled to produce the strobe pulse or signal on lead 102 thereby causing the sample and hold circuit 100 to produce a signal proportional to the amplitude of the voltage waveform at the time the strobe signal is received. If it is desired to cause the sampling signal to be proportional to the peak amplitude of the voltage waveform generated by the device 94 the Sample/-Hold-Peak Detect lead 160 is made to change state, and the width of the strobe signal is made as large as necessary. In the conventional manner, the sample and hold circuit will then produce a sampling signal which is proportional to the largest signal received during the application of the strobe signal (which would correspond to the peak amplitude of the voltage waveform).

The display section of the apparatus 86 is connected to the lead 104 and is operable to display the value of the voltage signal in the sample and hold circuit 100 in decimal form. More specifically, connected to the lead 104 is a discriminator 114 having a plurality of output channels represented by a cable 116. The discriminator 114 is enabled by an enable pulse applied to a lead 118 connected to the enable terminal of the dicriminator. As is conventional in discriminators of the type under consideration, an output signal will appear at one or more of the output channels in accordance with the value of the signal applied to the input terminals via the lead 104. For example, if the discriminator is a ten channel discriminator and is adapted to measure zero to 2 volts, a signal appearing at one output channel will represent a 0.2 volt increases over the preceeding channel. Thus, if the value of the signal applied via the lead 104 is 1.6 volts, a signal will appear at the first eight output channels of the discriminator. The discriminator may be reset by a reset signal applied to a lead 120 which is connected to the reset terminals of the discriminator.

The range of measurement of the discriminator 114 is determined by the value of the signals applied to a high and to a low input terminal of the discriminator. That is, for 10 channel discriminator each channel will represent an increase over the preceding channel which is equal to the difference between the values of the signals applied to the high and low terminals divided by 10.

The cable 116 connects the output channels of the discriminator 114 to a programmer designated generally by the reference numeral 122. The programmer 122 is adapted to encode the output signals of the discrimnator 114 as a four bit binary coded decimal number which controls a decoder and power supply and to apply appropriate level signals to the high and low input terminals of the discriminator 114.

More specifically, the programmer 122 may contain a register or encoder 124 which is connected to the output channels of the discriminator 114 via the lead 116. The register 124 is operable to encode the signals in the output channels of the discriminator into a four bit binary coded decimal number and to retain the number in the register. The output of the register is connected by a lead 125 to a decoder 127. The decoder 127 is connected by a lead 135 to a controlled supply 129 which, in turn, is connected by a cable 126 to the low input terminals of the discriminator 114. The register 124 is also connected to a reference register 128 by a lead 130. A shift pulse generator 132 is connected to the register 128 and is adapted to shift the numerals stored therein one place. The output of the reference register 128 (which is a four bit binary coded decimal number) is connected by a lead 131 to the decoder 127. Another output of the decoder 127 is connected by a lead 133 to a controlled supply 137 which, in turn, is connected by a cable 134 to the high input terminals of the discriminator. Thus, each output channel of the discriminator will represent an increment of voltage over the preceeding channel which is equal to the levels at the high and low terminals divided by the number of channels of the discriminator, as noted above.

The encoder or register 124 is also connected to a unit display decoder 136 and a ten display decoder 138 by respective cables 140 and 142. The display decoders 136 and 138 are connected to a conventional display which displays the value of the signal level in the decoder as a decimal number, in the conventional manner. Although a unit and tens display is shown, it is obvious that for higher value signals a hundreds displays etc. may also be included by increasing the capacity of the units.

In operation, the voltage measuring apparatus 86 is operated in the manner described above to cause the sample and hold circuit 100 to produce a signal on a lead 104 which is representative of the value of the voltage waveform at the desired instant. Initially, the signal applied to the low and high input terminals of the discriminator 114 may range from zero to some value in excess of the amplitude of the signal to be measured. For purposes of explanation, it is assumed that the discriminator is a ten channel discriminator and that the value of the signal on lead 104 to be measured is 1.7 volts. Accordingly, the signals applied to the low input terminal and the high input terminal may represent the respective voltages 0 and 2 volts whereby each output channel will represent a 0.2 volt increment. The enable signal applied to the lead 118 will cause the first eight channels of the discriminator to produce a signal which will be applied to the encoder or register 124 which produces a signal representative of the value 1.6 in binary coded decimal form. This signal will be applied to the low input terminal via the decoder 127, controlled supply 129 and the cable 126. Additionally, the shift pulse generator 132 and reference register 128 will cause the signal applied therefrom to the decoder 127 to operate the controlled supply 137 to cause the signal appearing on the cable 134 to represent the next higher voltage increment (which will be 1.8 volts). This will be applied to the high input terminal of the discriminator. The discriminator is reset by applying the appropriate reset signal to the lead 120.

For the values noted above, each channel of the discriminator will now represent a 0.02 voltage increment over the preceeding channel. If it is assumed that the value of the signal on the lead 104 is actually 1.7 volts, a signal will be produced at the first five output channels which, in turn, will be presented to the decoder and register 124. This latter signal will be detected by the display decoders 136 and 138 to cause the display to produce a 1.7 visual output. Additionally, the output of the decoder and register 124 may also be connected to an output terminal so that the value of the voltage waveform may be presented to a computer or the like in binary coded decimal form thereby facilitating further operations on the input information. After a value has been determined, the discriminator and the sample and hold circuit may be reset by applying the proper signals to the reset terminals of the elements.

In an actual fabrication of the system under consideration, the sample and hold circuit may comprise the model number 3,400 amplifier manufactured by the Burr-Brown Company of International Airport Industriel Park, Tucson, Arizona, 85706 The following elements manufactured by Technitrol Inc. of 1952 East Allengheny Avenue, Philadelphia, Pa. may also be used in the system. The amplifier 98 may comprise the Model 2,134 Difference Amplifier. The discrimator 114 may comprise the model 2,131A Multi-Channel Discriminator. The programmer 122 may comprise the Model 2,139 Signal Measurement Unit and the Model 2,132 Reference Power Supply. The display section may be implemented by the Model 2,137 Time Measurement Unit.

Figure 3:
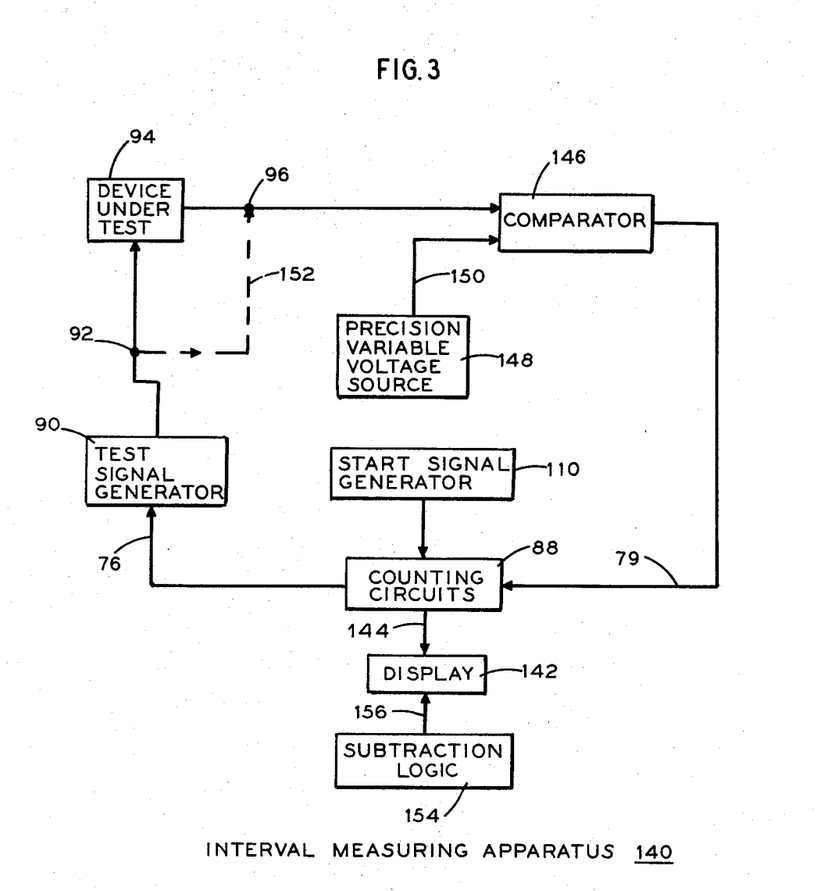
FIG. 3 is a schematic system diagram of a time interval counting apparatus constructed in accordance with the present invention.

The interval measuring apparatus is shown in FIG. 3 and is designated generally by the reference numeral 140. The apparatus 140 similarly includes counting circuits 88, start signal generator 110 connected thereto to initiate the operation of the counting circuits to measure the interval of time, and a test signal generator 90 connected thereto by the lead 76 which may be enabled by the synchronizing pulse or signal produced by the counting circuits 88 in the manner noted hereinabove with respect to the counting circuits or increment counter of FIG. 1. The counting circuits 88 are also connected to a display 142 via a lead 144. The display 142 is adapted to decode the increments counted in the counting circuits 88 and display the same as a decimal number.

Similar to the apparatus 86, the test signal generator 90 is connected to output terminals 92 which, in turn, are connected to the input terminals of a device under test 94. The output terminals of the device under test are connected to the input terminals 96 of the apparatus 140. Also connected to the input terminals 96 is one input of a comparator 146. The comparator is adapted to detect a specific event in a waveform applied to the terminals 96 and to generate a stop signal in response thereto. The stop signal is applied to the counting circuit 88 via the lead 78 thereby to terminate the counting operation so that the display 142 indicates the interval of time that has elapsed from the generation of the test signal which stimulates the device under test to the occurrence of the particular event.

The comparator 146 is conventional in construction and a precision variable voltage source 148 is connected thereto by a lead 150. In operation, the voltage source 148 is preset at a desired value. The comparator 146 compares the voltage waveform applied to the input terminal 96 with the value of the voltage from the voltage source and when the two are equal, the comparator produces the stop signal. The comparator 146 may also be provided with slope detectors so that the comparator may be pre-programmed to determine events on either the rising or falling portion of the waveform.

If it is desired, for example, to measure the rise time for a load to reach 90 percent of its peak value (and the rise time is in the nanosecond region) it is obvious that the propagation delays inherent in the system will have a great bearing on the accuracy of the measurement. That is, the propagation delays may be equal to or even greater than the actual rise times to be measured. Accordingly, the interval measuring apparatus 140 is operable to calculate the system delay or the propagation delay in the system and subtract such delay from the total interval calculated thereby to accurately determine the time for the particular event to occur.

More specifically, assuming that the desired event to be detected is the 90 percent value on the rising slope of a wave, the voltage source 148 is set at the particular value and the comparator 146 is programmed to make such comparison on the rising portion of the waveform. The output terminal 92 is connected directly with the input terminal 96 as indicated by the dashed lead 152. The start signal generator 110 is operated to generate a start signal which initiates operation of the counting circuits 88. Simultaneously with the initiation of the increment counting by the counting circuits, a synchronizing signal is applied to the test signal generator 90 which produces the test signal. This test signal is applied directly to the comparator 146 via the connection 152 and the input terminal 96.

When the test signal reaches the correct level as determined by the voltage source 148, the comparator 146 produces the stop signal which is then applied to the counting circuits via the lead 78. Accordingly, the counting circuits terminate the counting of time increments and the display 142 indicates what is essentially the propagation delay in the system. That is, the display will now indicate the elapsed time interval from the generation of the synchronizing pulse or signal to the detection of the specific event, which in the example under consideration is the 90 percent point on the rising voltage waveform. The propagation delay will include delays of the type atrributable to various elements changing states, inherent rise times involved for the signal to propagate down a transmission line, etc.

In accordance with the present invention, a subtraction logic circuit 154 is provided which is connected to the display portion of the counting arrangement by a lead 156. The subtraction logic circuit 154 is adapted to be preset to the propagation delay inherent in the system so that this propagation delay is subtracted from the increments counted by the display section 142. Accordingly, after the subtraction logic circuits have been implemented, the display 142 will only indicate the actual interval of time which has elapsed from the generation of the synchronizing signal to the particular event which is to be detected. That is, the propagation delay of the system will have been subtracted from the time increment count so that the time elapse which is indicated by the display may be considered to be absolute.

In one embodiment, the display 142 and the subtraction logic circuits 154 may together comprise two four bit binary adder logic circuits for each decade of numbers. The number for each decade representing the system propagation delay is entered into the adder circuits in its binary complement form. The adder circuits in each decade then use two's complement arithmetic to perform the subtraction, as noted more fully in Logical Design of Digital Computers by Montgomery Phister, Jr., John Wiley and Sons, New York, pages 279–285, Copyright 1958.

After the system propogation delay has been entered into the apparatus via the subtraction logic circuits 154, the output terminal 92 is connected to the device under test and the output terminals of the device under test 94 are connected to the input terminals 96. The connection 152 is removed and the counting circuits are reset and the start signal generator is enabled to initiate the counting circuits and to cause the generation of the synchronizing signal. Accordingly, the test signal will travel through the device under test and will be detected by the comparator. Thus, the stop signal will again be generated. However, at the termination of the counting cycle, the display 142 will now only indicate the actual time interval to the event under consideration.

The construction described above thereby permits the apparatus of the present invention to measure the time of occurrence of the peak in a unkknown voltage waveform by utilizing a single device. Thus, a voltage measurement is made first to determine the peak amplitude of the waveform. Thereafter the time interval counter is programmed to generate a stop pulse when the peak of the voltage waveform is detected. Hence, the interval counter will indicate the time of occurence of the peak of the waveform.

Accordingly, a signal measuring and counting apparatus and method have been disclosed which permit real time accurate measurements in the nanosecond region and which may be used to quickly and accurately measure the value of a voltage waveform at a specific point in time or measure the time interval to a preselected event in a voltage waveform.

While preferred embodiments of the invention have been shown and described herein it will be obvious that numerous omissions, changes and additions may be made in such embodiments without departing from the spirit and scope of the present invention.

What is claimed is:

1. Counting apparatus for counting time increments in an interval of time comprising oscillator means for producing a first signal having a preselected period, counting means having a plurality of input terminals for counting an increment of time in response to a second signal appearing at an input terminal, a plurality of time delay means coupled to said oscillator means, each said delay means progressively delaying said first signal along each of said time delay means, combining means for combining the outputs of each of said delay means for forming said second signal, said combining means connected between each one of said plurality of input terminals and said time delay means for applying said second signal to said plurality of input terminals in a predetermined sequence.

2. Counting apparatus as in claim 1, in which each of said delay lines delays said signal by an interval which is greater than the delay introduced by the preceeding delay line by the time increment counted.

3. Counting apparatus as in claim 1, in which the time increments counted are equal portions of said preselected period, and the difference in delay introduced by any two of said delay lines is a multiple of said time increment.

4. Counting apparatus as in claim 1, in which said combining means comprises a plurality of bistable devices respectively connected to a different one of said time delay means and movable from one state to another state in response to said signal applied to the associated input terminal, and coding means responsive to the state of said bistable devices for indicating the time increments counted.

5. Counting apparatus as in claim 4, and subtracting means connected to said coding means for subtracting a desired number from the time increments counted.

6. Counting apparatus as in claim 4, in which the time increments counted are equal portions of said preselected period, said connecting means comprising a lead connecting one of said plurality of input terminals to said oscillator means, and respective delay lines connecting the other of said plurality of input terminals to said oscillator means, each one of said delay lines introducing a delay which is greater than the delay introduced by the preceding connection between said oscillator means and an input terminal by a value equal to said time increment.

7. Counting apparatus as in claim 6, in which each delay line comprises a series terminated microstrip transmission line.

8. Counting apparatus as in claim 6, in which said oscillator means produces a 200 MHz signal, said plurality of input terminals comprising five in number, said lead connecting a first of said input terminals to oscillator means, said delay lines respectively connecting the remaining four of said input terminals to said oscillator means, wherein said delay lines respectively introduce delays of 1, 2, 3, and 4 nanoseconds.

9. Counting apparatus as in claim 1, and inhibit means between said oscillator means and said counting means responsive to an inhibit signal for inhibiting application of said oscillator means signal to said plurality of input terminals.

10. Counting apparatus as in claim 1, in which said oscillator means comprises an oscillator, and means responsive to a start signal for synchronizing said counting means with said oscillator.

11. Counting apparatus as in claim 1, in which said connecting means comprises a first set of counting registers and said counting means a second set of counting registers, said first and second set of counting registers each being responsive to said oscillator means signal for counting said time increments, first inhibit means connecting said first set of counting registers with said plurality of input terminals and responsive to a start signal for preventing transmission of said oscillator means signal to said first set of counting registers, and second inhibit means connecting said second set of counting registers with said plurality of input terminals and responsive to a stop signal for preventing transmission of said oscillator means signal to said second set of counting registers.

* * * * *